(12) United States Patent
Macchia et al.

(10) Patent No.: US 9,334,067 B2
(45) Date of Patent: May 10, 2016

(54) REAL-TIME AIRCRAFT MAINTENANCE TERMINAL

(71) Applicant: PRATT & WHITNEY CANADA CORP., Longueuil (CA)

(72) Inventors: Enzo Macchia, Kleinburg (CA); George Guglielmin, Toronto (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 0 days.

(21) Appl. No.: 14/839,092

(22) Filed: Aug. 28, 2015

(65) Prior Publication Data
US 2015/0360798 A1    Dec. 17, 2015

Related U.S. Application Data

(62) Division of application No. 11/941,188, filed on Nov. 16, 2007.

(51) Int. Cl.
*B64F 5/00* (2006.01)
*G06F 7/00* (2006.01)
*G06Q 10/06* (2012.01)
*G07C 5/00* (2006.01)
*G07C 5/08* (2006.01)

(52) U.S. Cl.
CPC .............. *B64F 5/0045* (2013.01); *G06Q 10/06* (2013.01); *G07C 5/008* (2013.01); *G07C 5/085* (2013.01); *G07C 5/0808* (2013.01); *G07C 5/0816* (2013.01); *G07C 5/0841* (2013.01)

(58) Field of Classification Search
CPC .... G07C 5/008; G07C 5/0808; G07C 5/0816; G07C 5/0841; G07C 5/085; B64F 5/00; B64F 5/0045; G06Q 10/06

USPC .......................... 701/3, 31.4, 31.5, 32.7, 33.2; 244/17.13, 194
See application file for complete search history.

(56) References Cited

U.S. PATENT DOCUMENTS

| | | | |
|---|---|---|---|
| 5,931,877 A * | 8/1999 | Smith | B64D 7/00 701/31.5 |
| 6,115,656 A * | 9/2000 | Sudolsky | B64F 5/0045 701/3 |
| 6,370,454 B1 | 4/2002 | Moore | |
| 6,574,537 B2 | 6/2003 | Kipersztok et al. | |
| 6,662,091 B2 | 12/2003 | Wilson et al. | |
| 6,671,593 B2 | 12/2003 | Sinex | |

(Continued)

*Primary Examiner* — Jack W Keith
*Assistant Examiner* — Chuong P Nguyen
(74) *Attorney, Agent, or Firm* — Norton Rose Fulbright Canada LLP

(57) ABSTRACT

There is described a portable data transmission unit comprising a communications link for electrical connection to an aircraft engine to be maintained; an application coupled to a processor and configured for capturing in real time performance data indicative of a performance of the aircraft engine and making the performance data available for analysis upon landing of the aircraft, retrieving maintenance data related to the aircraft engine and performing maintenance operations on the aircraft engine; a user interface to display the maintenance data and receive input data, the maintenance operations performed on the aircraft engine directly through the data transmission unit using the input data and the maintenance data; a microphone to convert sound waves into an electric current; a speaker to convert analog audio signals into air vibrations to make audible sound; and a transceiver to transmit and receive in real time voice and data signals wirelessly across a network.

10 Claims, 2 Drawing Sheets

(56) References Cited

U.S. PATENT DOCUMENTS

| | | |
|---|---|---|
| 6,684,136 B2 | 1/2004 | Sinex |
| 6,691,006 B2 | 2/2004 | Sinex |
| 6,732,028 B2 | 5/2004 | Vanstory et al. |
| 6,748,211 B1 | 6/2004 | Isaac et al. |
| 6,751,536 B1 | 6/2004 | Kipersztok et al. |
| 6,789,007 B2 | 9/2004 | Ellis et al. |
| 6,820,055 B2 * | 11/2004 | Saindon ............... G10L 15/26 704/235 |
| 6,826,461 B2 | 11/2004 | Sinex |
| 6,941,204 B2 * | 9/2005 | Halm ................... B64D 47/00 340/539.24 |
| 7,002,462 B2 | 2/2006 | Welch |
| 7,050,894 B2 | 5/2006 | Halm et al. |
| 7,058,542 B2 | 6/2006 | Hauhia et al. |
| 7,167,786 B2 | 1/2007 | Sinex |
| 7,209,814 B2 | 4/2007 | Kipersztok et al. |
| 7,302,371 B2 | 11/2007 | Oesterling et al. |
| 7,328,011 B2 | 2/2008 | Fagan et al. |
| 7,920,944 B2 | 4/2011 | Gould et al. |
| 7,979,192 B2 | 7/2011 | Morrison et al. |
| 2003/0083794 A1 | 5/2003 | Halm et al. |
| 2003/0158738 A1 * | 8/2003 | Crosby ................. G06Q 10/02 704/275 |
| 2003/0215128 A1 * | 11/2003 | Thompson ............ B64F 5/0045 382/141 |
| 2005/0149238 A1 * | 7/2005 | Stefani ................. G01D 9/005 701/33.4 |
| 2006/0015777 A1 | 1/2006 | Loda |
| 2006/0179949 A1 | 8/2006 | Kim |
| 2007/0010922 A1 | 1/2007 | Buckley |
| 2007/0093947 A1 | 4/2007 | Gould et al. |
| 2007/0294001 A1 * | 12/2007 | Underdal ............. G06N 7/005 701/31.4 |
| 2009/0111520 A1 * | 4/2009 | Ring ..................... G07C 5/008 455/557 |
| 2009/0198390 A1 | 8/2009 | Bovet et al. |

\* cited by examiner

REAL-TIME AIRCRAFT MAINTENANCE TERMINAL

CROSS-REFERENCE TO RELATED APPLICATIONS

The present application is a divisional of patent application Ser. No. 11/941,188, filed on Nov. 16, 2007, the contents of which are hereby incorporated by reference.

TECHNICAL FIELD

The present invention generally relates to the field of real-time communication devices, and more specifically, to an aircraft maintenance communication system incorporating real-time information transfer.

BACKGROUND

When maintenance personnel are servicing systems such as aircrafts, they sometimes need to contact a help desk or customer support services. This is typically done using cell phones or land lines as available. They may also need to consult operation manuals while servicing the system.

Juggling a cell phone, a hard copy manual, and tools can be frustrating and dangerous from a safety point of view. This type of work is very time consuming for a mechanic and the ability to communicate clearly when needed is directly related to the efficiency with which the servicing can be done.

SUMMARY

There is described herein a maintenance communication system incorporating real-time information transfer to be used with any components present on an aircraft.

In accordance with a first broad aspect, there is provided an aircraft maintenance communication system comprising a portable data transmission unit adjacent to an aircraft engine to be maintained, the data transmission unit electrically connected to the aircraft engine via a communications link and part of an on-board engine performance monitoring system of the aircraft. The data transmission unit comprises an application coupled to a processor and configured for capturing in real time performance data indicative of a performance of the aircraft engine and making the performance data available for analysis upon landing of the aircraft, retrieving maintenance data relating to said aircraft engine, and performing maintenance operations on the aircraft engine; a user interface to display said maintenance data and receive input data, the maintenance operations performed on the aircraft engine directly through the data transmission unit using the received input data and the displayed maintenance data; a microphone to convert sound waves into an electric current; a speaker to convert analog audio signals into air vibrations in order to make audible sound; and a transceiver adapted to transmit and receive in real time voice and data signals wirelessly across a network during said maintenance operations. The system also comprises at least one remote communication terminal adapted to receive said voice and data signals transmitted from said data transmission unit across said network in real time and transmit voice and data signals to said data transmission unit across said network in real time.

In accordance with a second broad aspect, there is provided a portable data transmission unit for an aircraft, the data transmission unit part of an on-board engine performance monitoring system of the aircraft and comprising a communications link for electrical connection to an aircraft engine to be maintained, the data transmission unit adjacent to the aircraft engine; an application coupled to a processor and configured for capturing in real time performance data indicative of a performance of the aircraft engine and making the performance data available for analysis upon landing of the aircraft, retrieving maintenance data related to said aircraft engine, and performing maintenance operations on the aircraft engine; a user interface to display said maintenance data and receive input data, the maintenance operations performed on the aircraft engine directly through the data transmission unit using the received input data and the displayed maintenance data; a microphone to convert sound waves into an electric current; a speaker to convert analog audio signals into air vibrations in order to make audible sound; and a transceiver adapted to transmit and receive in real time voice and data signals wirelessly across a network to communicate with at least one remote communication terminal in real time during said maintenance operations.

BRIEF DESCRIPTION OF THE DRAWINGS

Reference is now made to the accompanying figures.

It will be noted that throughout the appended drawings, like features are identified by like reference numerals.

DETAILED DESCRIPTION

Figure 1:
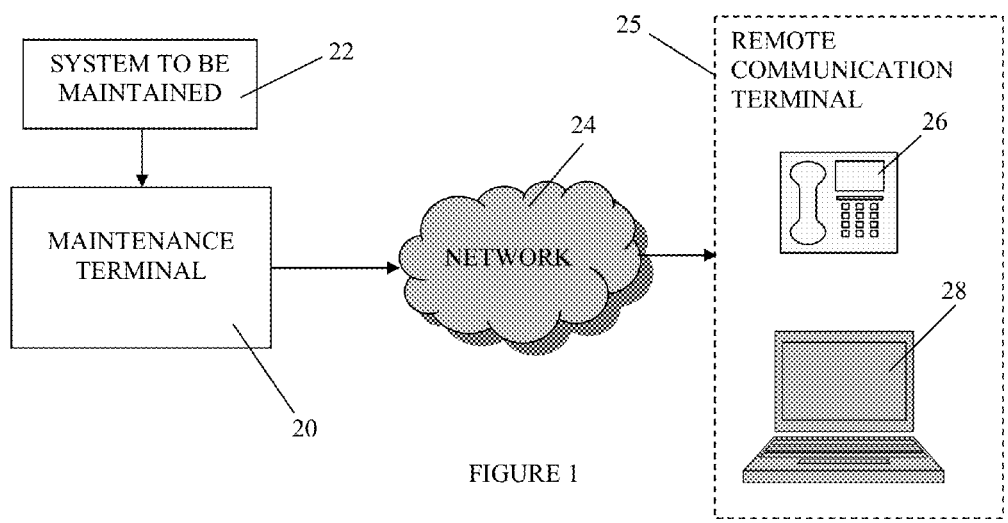
FIG. 1 illustrates an embodiment of a maintenance communication system.

FIG. 1 illustrates an embodiment of a maintenance communication system. Direct contact (voice, email, etc) with a central help desk is enabled from an aircraft component. A maintenance terminal 20 is coupled to a system to be maintained 22 via a communication link in order to establish an electrical connection between the two. The maintenance terminal can access and retrieve maintenance data from the system to be maintained 22, the data being related to the operation of the system.

The maintenance terminal 20 provides a real-time connection and data upload/download to a remote communication terminal 25 via a network 24. The network may be satellite, WPAN, Cellular, WLAN, Internet, or the like. The user communicating through the maintenance terminal 20 transmits voice and/or data through the network 24. The remote communication terminal 25 may receive voice and/or data signals. The remote communication terminal 25 may be a telephone 26 or a computer device 28 that can receive voice signals.

In one embodiment, both voice and data signals may be transmitted using a single maintenance terminal 20. In this case, the network 24 used for the transmission is the internet network (or any other IP-based network) and the communication protocol is the Voice over Internet Protocol (VoIP).

The remote communication terminal 25 may be used by a customer support center, a help desk, an OEM, a manufacturer, or an experienced technician offering technical support. The user communicating through the maintenance terminal 20 may be an engineer, technician, mechanic, pilot, or any other individual who services or maintains the system on which the device 20 is mounted. Communication between the remote communication terminal 25 and the maintenance terminal is done in real-time. The maintenance terminal 20 is provided either on or adjacent to a component being maintained 22. For example, if the maintenance terminal is intended for an aircraft engine, communication may be initiated directly from the engine component without needing to move away from the problem area. The mechanic is immediately in contact with the supply chain (repair shop, inventory, logistics databases, etc) via the terminal 20. In one embodiment, simply pushing a button will allow immediate contact with a person, either through voice, text message, email, voice to digital, or digital to voice communication.

Figure 2:
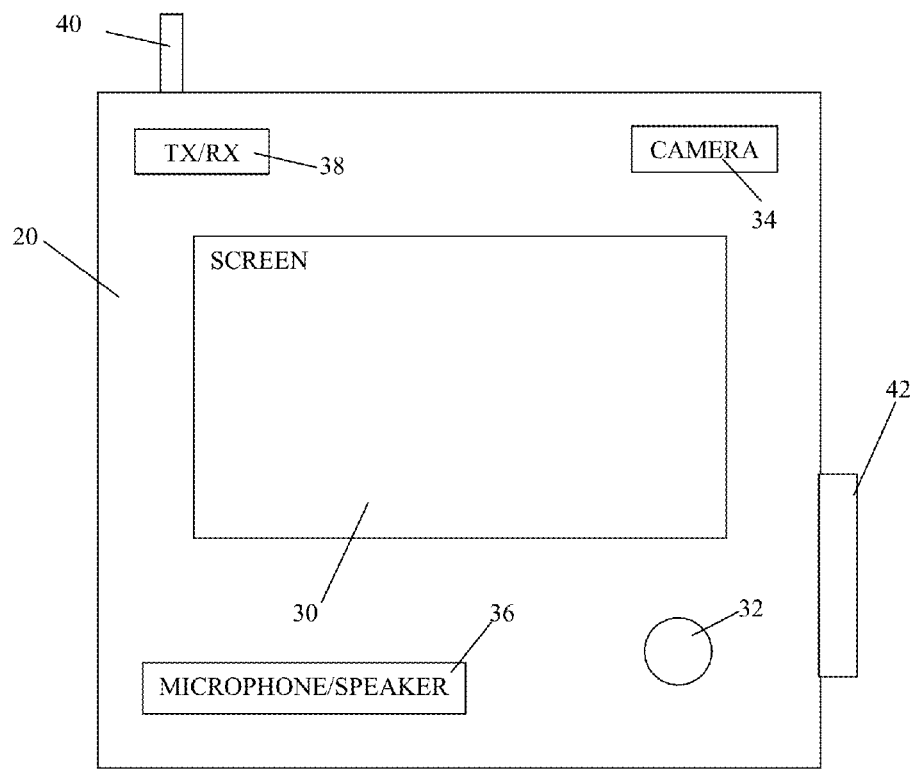
FIG. 2 illustrates an embodiment of a maintenance terminal.

FIG. 2 illustrates an embodiment of the maintenance terminal 20. In this embodiment, a user interface including a screen 30 is present on the maintenance terminal 20, and video and/or still digital photos may be transmitted over the network 24. The device 20 may also be equipped with a camera 34 to record the user or an object the user may want to show the person with whom he is communicating. For example, an image of a part or a piece of equipment may be captured using the camera 34 and transmitted in real-time to a help desk operator.

The user may use the screen 30 of the maintenance terminal 20 to access various information. For example, a component may be shown in real-time to the operator at the remote communication terminal 25. Data relating to the system to be maintained 22 may be accessed and displayed. Parts availability may be accessed in real-time via online manuals. Logs and history may be accessed and viewed in real-time. In one embodiment, the device 20 may be configured to display multiple information at once on the screen 30.

A microphone/speaker 36 is present on the maintenance terminal 20 to allow the user to speak directly into the device 20 and hear a voice signal. The microphone/speaker 36 may be activated by pressing a button 32 on the device 20. The button 32 may cause a communication to be automatically established with a given remote communication terminal 25. Alternatively, the device 20 may be capable of communicating with multiple remote communication terminals. Contact information may be pre-programmed into the device 20 and the user may establish a communication by making a selection in a list, or the device may be configured to contact any arbitrary destination using the appropriate contact information. A transceiver 38, with the use of an antenna 40, sends and receives voice and/or data signals wirelessly.

In one embodiment, the device 20 can convert voice signals into data signals. For example, a user can speak into the microphone/speaker 36 and text is generated in real-time to a remote operator. The voice signals may be in a first language and the text may be in a second language, thereby allowing two individuals speaking different languages to communicate together for the purpose of maintenance of the system 22. Conversely, data signals may be converted into voice signals. The operator may type a text and voice signals are generated and transmitted to the user via the device 20.

In one embodiment, the device 20 may have a connection port 40, such as a USB port, to allow connection to a laptop, a PDA, a Blackberry™, a camera, or any other type of electronic device. Alternatively, connection with an electronic device may be done wirelessly via the transceiver and antenna 40. The user interface of the connected electronic device may act as the user interface for the maintenance terminal 20.

In one embodiment, the system to be maintained is an aircraft, and the maintenance terminal is a data transmission unit (DTU). A DTU is a component of an on-board engine performance monitoring system of an aircraft which automatically downloads engine performance data for analysis. The DTU captures engine health data. Engine parameters, such as temperature, fuel flow, and speed can be captured. The source of the data is either pre-existing on-board avionics or an integrated monitor, such as an Aircraft Data Acquisition System (ADAS). On landing, the DTU automatically collects data from the engine/airframe monitor(s). The data is automatically processed and made available for analysis. When the unit is put into "maintenance mode", the user is able to view fault codes and live engine data to diagnose engine problems or events. The maintenance terminal 20 may be placed on any aircraft component, such as a gas turbine engine.

Figure 3:
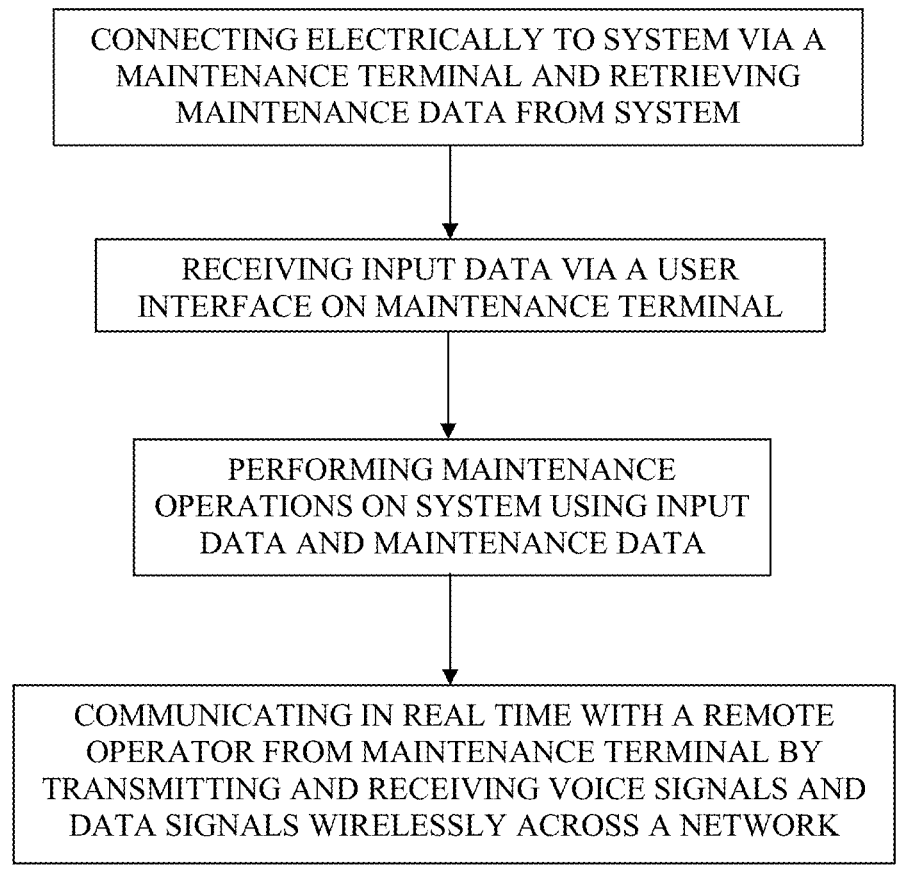
FIG. 3 is a flow chart illustrating an embodiment of a method of maintenance of a system.

FIG. 3 illustrates an embodiment for a method for maintenance of a system. A first step consists in connecting electrically to the system via a maintenance terminal and retrieving maintenance data from the system. Input data is received from the user via a user interface on the maintenance terminal. Various maintenance operations are performed by the user on the system using the input data and/or the maintenance data. During this process, the user may communicate in real time with a remote operator via the maintenance terminal, by transmitting and receiving voice signals and data signal wirelessly across a network.

Software may be present on the maintenance terminal to allow the user to access the internet and various remote databases. For example, a central server may provide information concerning available replacement parts for the system. Another example would be technical reports or manuals also available at a remote location. An application is coupled to a processor in the maintenance terminal and the application is configured to run to perform various tasks. Examples of types of applications that may be present in the maintenance terminal are data management, word processing, spreadsheets, presentation graphics, communications and electronic mail, Web browser, CAD, imaging, multimedia, and any other types of applications typically available for a computer. System software, including an operating system, control programs, and database management systems, may also be present to control the computer and develop and run application programs.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

The above description is meant to be exemplary only, and one skilled in the art will recognize that changes may be made to the embodiments described without departing from the scope of the invention disclosed.

The invention claimed is:

1. An aircraft maintenance communication system comprising:
 a portable data transmission unit adjacent to an aircraft engine to be maintained, the data transmission unit electrically connected to the aircraft engine via a communications link and part of an on-board engine performance monitoring system of the aircraft, the data transmission unit comprising:
  an application coupled to a processor and configured for capturing in real time performance data indicative of a performance of the aircraft engine and making the performance data available for analysis upon landing of the aircraft, retrieving maintenance data relating to said aircraft engine, and performing maintenance operations on the aircraft engine;

a user interface configured to display said maintenance data and receive input data, the maintenance operations performed on the aircraft engine directly through the data transmission unit using the received input data and the displayed maintenance data;

a microphone arranged to convert sound waves into an electric current;

a speaker arranged to convert analog audio signals into air vibrations in order to make audible sound; and a transceiver configured to transmit and receive in real time voice and data signals wirelessly across a network during said maintenance operations; and at least one remote communication terminal configured to receive said voice and data signals transmitted from said data transmission unit across said network in real time and transmit voice and data signals to said data transmission unit across said network in real time.

2. A system as claimed in claim 1, wherein said application is configured to access and retrieve information for said maintenance from at least one remote database via said network.

3. A system as claimed in claim 1, wherein said data transmission unit comprises a camera arranged for capturing at least one of still photos and videos.

4. A system as claimed in claim 1, wherein at least one of said data transmission unit and said remote communication terminal is configured to convert a voice signal into a data signal and a data signal into a voice signal.

5. A system as claimed in claim 4, wherein said voice signal is in a first language and said data signal is in a second language.

6. A portable data transmission unit for an aircraft, the data transmission unit part of an on-board engine performance monitoring system of the aircraft and comprising:

a communications link arranged for electrical connection to an aircraft engine to be maintained, the data transmission unit adjacent to the aircraft engine;

an application coupled to a processor and configured for capturing in real time performance data indicative of a performance of the aircraft engine and making the performance data available for analysis upon landing of the aircraft, retrieving maintenance data related to said aircraft engine, and performing maintenance operations on the aircraft engine;

a user interface configured to display said maintenance data and receive input data, the maintenance operations performed on the aircraft engine directly through the data transmission unit using the received input data and the displayed maintenance data;

a microphone arranged to convert sound waves into an electric current;

a speaker arranged to convert analog audio signals into air vibrations in order to make audible sound; and a transceiver configured to transmit and receive in real time voice and data signals wirelessly across a network to communicate with at least one remote communication terminal in real time during said maintenance operations.

7. A data transmission unit as claimed in claim 6, wherein said application is configured to access and retrieve information for said maintenance from at least one remote database via said network.

8. A data transmission unit as claimed in claim 6, further comprising a camera arranged for capturing at least one of still photos and videos.

9. A data transmission unit as claimed in claim 6, wherein said application is configured to convert a voice signal into a data signal and a data signal into a voice signal.

10. A data transmission unit as claimed in claim 9, wherein said voice signal is in a first language and said data signal is in a second language.

* * * * *